May 9, 1933.  C. R. COOK  1,908,322
WEED PULLER
Filed April 7, 1932
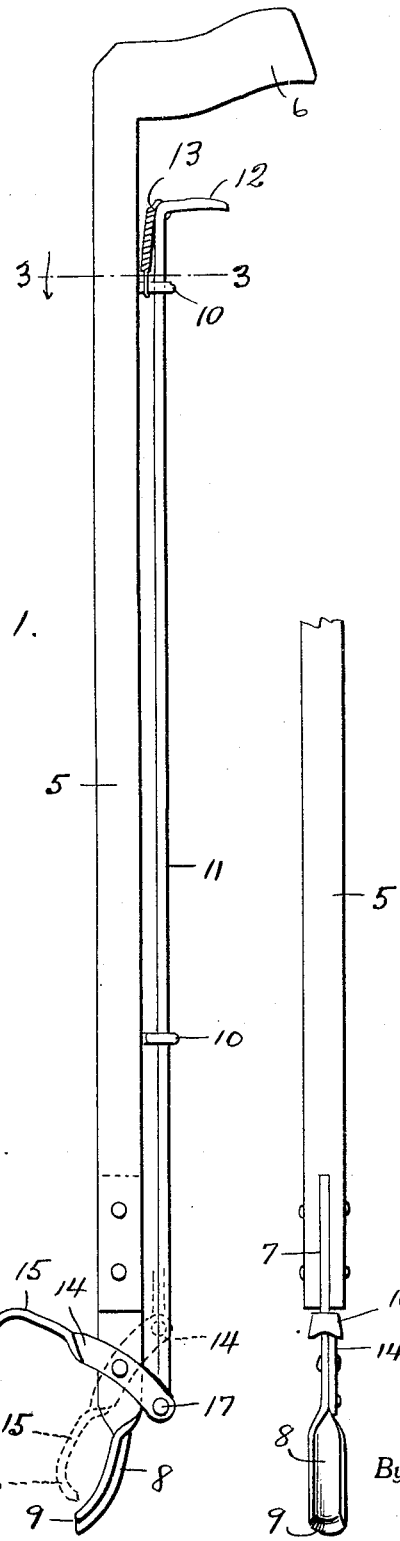
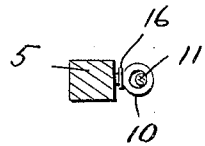
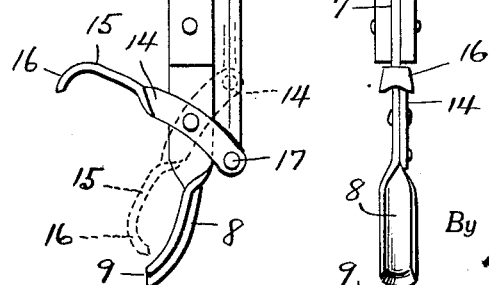
Inventor
Claude R. Cook
By Clarence A. O'Brien
Attorney Patented May 9, 1933

1,908,322

UNITED STATES PATENT OFFICE

CLAUDE R. COOK, OF ASHEVILLE, NORTH CAROLINA

WEED PULLER

Application filed April 7, 1932. Serial No. 603,886.

This invention appertains to new and useful improvements in weed pullers and more particularly to a novel hand device which may be manually operated by one hand of the operator.

The principal object of the present invention is to provide a weed puller which in the operation of pulling a weed will not leave a noticeable opening in the ground.

Another important object of the invention is to provide a weed puller which can be operated quickly and easily and which will be of low cost of manufacture.

These and other important objects and advantages of the invention will become apparent to the reader of the following specification.

In the drawing:—

Figure 1 represents a side elevational view of the device in its entirety.

Fig. 2 represents a fragmentary front elevational view of the implement.

Fig. 3 represents a cross sectional view taken substantially on line 3—3 of Fig. 1.

Referring to the drawing wherein like numerals designate like parts, it can be seen that numeral 5 represents an elongated bar which is provided with a laterally disposed handle 6 at the upper end thereof.

The lower end of this bar 5 is bifurcated to receive the shank 7 of the transversely curved blade 8. This shank 7 and blade 8 are constructed of a single strip of strip iron or the like, the blade 8 being twisted to a position on a plane at right angles to the shank 7 and both transversely and longitudinally curved with the extremity thereof beveled to provide a cutting edge 9.

The bar 5 is provided with several eye members 10—10 which afford guide means for the slidable rod 11, the rod 11 being provided with a laterally disposed handle 12 at its upper end in spaced parallel relation to the handle 6. Interposed between the handle 12 and the upper eye member 10 is the extensible coiled spring 13 for normally maintaining the rod 11 urged in a downward direction.

Swingably mounted on the lower portion of the shank 7 is the arm 14 which is provided with a right angularly twisted portion 15 curved at its outer end as at 16 to provide a claw complemental with the blade 8.

The free end of the arm 14 is pivotally connected as at 17 to the lower end of the rod 11 and obviously, by pulling upwardly on the handle 12, the rod 11 will be lifted and the claw 16 will be moved downwardly to the dotted line position shown in Fig. 1.

In the operation of the device, the handle 6 is forced downwardly so that the blade 8 will be urged in to the ground so as to cut through the roots of a weed. Subsequently, the handle 12 is pulled, which obviously moves the claw 16 against the weed, clamping the weed between the blade 8 and the claw. By subsequent upward movement of the implement, the entire weed can be pulled from the ground.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

An implement of the character described comprising a handle bar, a blade projecting from one end of the handle bar, said blade being curved laterally with respect to the bar, and a pivotal claw on the end portion of the bar adjacent the blade for cooperation with the blade, said claw being constructed of strap iron and twisted at its intermediate portion to provide a shoulder abuttable with the blade when in contracted position.

In testimony whereof I affix my signature.

CLAUDE R. COOK.